3,174,283
EXPENDABLE BARRIER
Luigi Crocco and David T. Harrje, Princeton, N.J., and Frederick H. Reardon, Carmichael, Calif., assignors, by mesne assignments, to the United States of America as represented by the Secretary of the Navy
Filed June 28, 1963, Ser. No. 291,591
2 Claims. (Cl. 60—35.6)

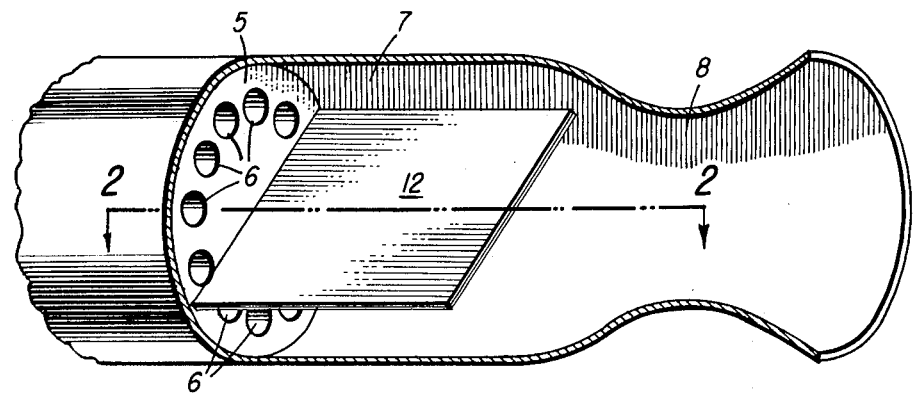
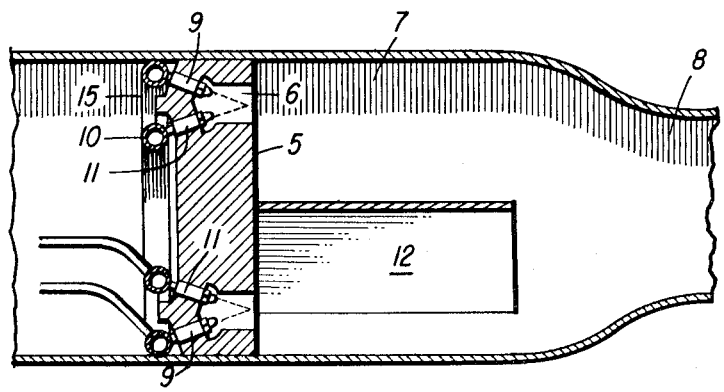
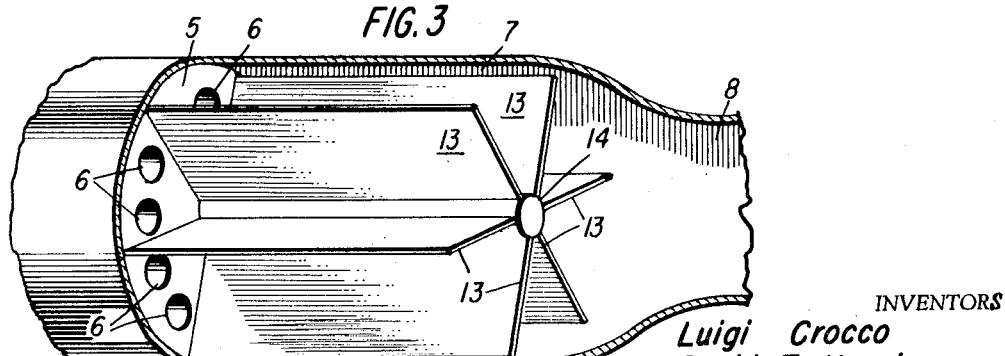

This invention relates to a barrier for use in a liquid propellant rocket motor to prevent transverse instability from being initiated from disturbances occurring during the starting transients. More especially, it relates to that type of barrier which after serving its purpose may be consumed in the combustion chamber.

Previously, liquid propellant rocket motors have been subject to transverse modes of combustion instability because of mixing of the vapor of one propellant and droplets of the other propellant. This is particularly evident during the starting transients when steady flow has not been fully established.

Theoretical background on the occurrence of high frequency instability has been advanced in a paper entitled "Aspects of Combustion Stability in Liquid Propellant Rocket Motors" (JARS November 1951 and January, February 1952) written by Professor Crocco (one of the joint inventors). More recently, another paper by the inventors has covered the specific topic of "Transverse Combustion Instability in Liquid Propellant Rocket Motors" (JARS March 1962). These papers form the theoretical background for the invention described herein.

The problem of obtaining a stabilized mixing process, which allows burning at a controlled rate in the combustion chamber and thereby produces a controlled thrust, has retarded the use of liquid propellant rocket motors.

One object of the present invention is to provide a simple mechanical barrier which is located close to the injector face and which is constructed out of such material, that once a path for the combustion gases has been established and an even unvarying thrust is being delivered that the barrier will be consumed within the combustion chamber.

A further object of the present invention is to provide a mechanical device which will prevent the velocity and pressure fluctuation of the mixed gases near the injector face from disturbing the propellant mixing.

It is still a further object of the invention to provide a mechanical fixture made of material, which will be consumed after a limited period of use, in the form of one or more plane surfaces extending from the injector face throughout the length of the combustion chamber and dividing the injector face into a plurality of equal surface discharge areas.

Other objects, advantages and novel features of the invention will become apparent from the following detailed description of the invention when considered in conjunction with the accompanying drawings wherein:

FIG. 1 is a perspective view of a rocket motor combustion chamber, with portions thereof broken away.

FIG. 2 is a sectional view taken along line 2—2 of FIG. 1.

FIG. 3 shows a modified form of barrier in a view similar to FIG. 1.

Referring to the drawings in which like numerals refer to like parts throughout the several views, 5 indicates the injector face of a liquid propellant rocket motor formed with openings 6 in which oxygen and alcohol are mixed and fed into the combustion chamber 7 from which the ignited gases are discharged through the nozzle 8.

The injector face 5 is in the form of a circular disk having symmetrically spaced openings 6 in the rear end of which openings are mounted a jet nozzle 9 connected to a manifold 15 and delivering oxygen to the combustion chamber, as well as a jet nozzle 11 connected to a central annular manifold and delivering alcohol to the combustion chamber. These nozzles are set at an angle so that their spray will meet approximately in the injector face where they will mix, the mixture being hypergolic will ignite so that the burning will start at the injector face. These gases are fed into the combustion chamber ordinarily in swirling masses at high pressures and form cross currents and voids within the structure of the gases. High pressures resuliting from the burning gases create pressure fluctuations which disturb the propellant mixing.

The present invention seeks to overcome the transverse combutsion instability caused by the fluctuations of pressure within the combustion chamber. The mixed gases tend to flow from the openings in various paths until they are ignited, and the resulting tremendous pressures create transverse instability in the burning area with a result that an uneven thrust is delivered at the nozzle 8.

To break up this gaseous fluctuation, plane surface barriers 12 are introduced in the combustion chamber, connected at one end to injector face 5 and extending the length of the combustion chamber to terminate adjacent the nozzle 8. These barriers divide the surface of the injector face into equal discharge areas and during the initial stages of rocket motor operation provide compartments within the combustion chamber to more or less guide and restrict the burning gases.

FIG. 1 shows a single surface 12 dividing the combustion chamber into two compartments. FIG. 3 shows a different design of barrier in which a plurality of plane surfaces 13 are secured to a cylindrical core 14 and extend from the core radially to provide, with the walls of the combustion chamber, a series of compartments extending the length of the combustion chamber. They also divide the injector face into a plurality of equal discharge areas.

The plane surfaces are made of a light material such as aluminum or a plastic which, while serving the operational functions during the initial stages of operation of the liquid propellant rocket motor, are consumed after the motor has been operating a short time.

Obviously many modifications and variations of the present invention are possible in the light of the above teachings. It is, therefore, to be understood that within the scope of the appended claims the invention may be practiced otherwise than as specifically described.

What is claimed is:

1. In a liquid propellant rocket motor having an injector face formed with a plurality of openings and a pair of injector nozzles in each of the openings, a combustion chamber and an exhaust nozzle, a diametrical barrier comprising a substantially rectangular planar, combustible dividing plate attached at one end to the injector face and extending substantially the full length of the combustion chamber to divide the combustion chamber into a plurality of substantially equal temporary sectors, said plate acting prior to being consumed, to prevent transverse combustion transients on starting of the motor.

2. In a liquid propellant rocket motor having an injector face formed with a plurality of openings and a pair of injector nozzles in each of the openings, a combustion chamber and an exhaust nozzle, a diametrical barrier comprising a plurality of rectangular planar combustible dividing plates radiating from a common longitudinal center attached at one end to the injector face and extending substantially the full length of the combustion chamber, to divide the combustion chamber into a plurality of substantially equal temporary combustion sectors, said plates acting prior to being consumed, to prevent transverse combustion transients on starting of the motor.

References Cited by the Examiner

UNITED STATES PATENTS

| | | |
|---|---|---|
| 2,510,572 | 6/50 | Goddard. |
| 2,706,887 | 4/55 | Grow _____ 60—35.6 |
| 2,781,633 | 2/57 | Rogers et al. _____ 60—35.6 |
| 3,041,836 | 7/62 | Truman et al. _____ 60—39.69 |
| 3,046,736 | 7/62 | Thomson _____ 60—35.6 X |
| 3,087,306 | 4/63 | Henderson et al. _____ 60—35.6 X |

FOREIGN PATENTS 656,930  9/57  Great Britain.

SAMUEL LEVINE, *Primary Examiner.*